US012695724B2

(12) United States Patent
Heranjal

(10) Patent No.:    US 12,695,724 B2
(45) **Date of Patent:       \*Jul. 28, 2026**

(54) SYSTEM AND METHOD FOR FLOW CLASSIFICATION IN MULTITENANT VPN NETWORKS

(71) Applicant: Alkira, Inc., San Jose, CA (US)

(72) Inventor: Shreyas Heranjal, San Jose, CA (US)

(73) Assignee: Alkira, Inc., San Jose, CA (US)

( \* ) Notice: Subject to any disclaimer, the term of this patent is extended or adjusted under 35 U.S.C. 154(b) by 315 days.

This patent is subject to a terminal disclaimer.

(21) Appl. No.: 18/180,457

(22) Filed: Mar. 8, 2023

(65) Prior Publication Data

US 2023/0291713 A1      Sep. 14, 2023

Related U.S. Application Data

(60) Provisional application No. 63/318,276, filed on Mar. 9, 2022.

(51) Int. Cl.
| | |
|---|---|
| *H04L 9/40* | (2022.01) |
| *H04L 12/46* | (2006.01) |
| *H04L 12/66* | (2006.01) |
| *H04L 45/02* | (2022.01) |

(52) U.S. Cl.
CPC ...... *H04L 63/0272* (2013.01); *H04L 12/4633* (2013.01); *H04L 12/66* (2013.01); *H04L 45/04* (2013.01); *H04L 63/0218* (2013.01)

(58) Field of Classification Search
CPC ............. H04L 63/0272; H04L 12/4633; H04L 12/4641; H04L 45/38
See application file for complete search history.

(56) References Cited

U.S. PATENT DOCUMENTS

| | | | | |
|---|---|---|---|---|
| 7,633,956 | B1 * | 12/2009 | Parandekar | ......... H04L 12/2898 370/429 |
| 7,894,434 | B2 * | 2/2011 | Anantharamaiah | ......................... H04L 12/1428 370/235 |
| 8,422,502 | B1 * | 4/2013 | Alaettinoglu | ........... H04L 45/38 370/395.3 |
| 9,397,946 | B1 * | 7/2016 | Yadav | ................. H04L 41/0806 |
| 11,088,948 | B1 * | 8/2021 | Talur | ................... H04L 63/0254 |
| 11,356,369 | B1 * | 6/2022 | Loganathan | ............ H04L 45/02 |
| 2003/0117954 | A1 * | 6/2003 | De Neve | ............. H04L 65/1043 370/395.2 |
| 2003/0142674 | A1 * | 7/2003 | Casey | ................. H04L 12/4641 370/393 |
| 2004/0223500 | A1 * | 11/2004 | Sanderson | .......... H04L 12/4641 370/395.53 |
| 2009/0216867 | A1 * | 8/2009 | Pusateri | .............. H04L 41/0894 709/222 |

(Continued)

*Primary Examiner* — Hieu T Hoang
(74) *Attorney, Agent, or Firm* — Vani Moodley, Esq.

(57) ABSTRACT

A cloud exchange platform includes policy-based routing. Labeling (or tagging) on a multi-tenant virtual private network (VPN) facilitates recognition of active routes for a flow. The tags can be implemented such that flows are treated as having active routes across a multi-tenant VPN to enable a customer to treat flows as having an identifiable active route through the multi-tenant VPN. Thus, for example, BGP can be used as a generalized signaling protocol to carry information about flows through a multi-tenant VPN.

11 Claims, 13 Drawing Sheets

(56)        References Cited

U.S. PATENT DOCUMENTS

| | | | |
|---|---|---|---|
| 2013/0031271 A1* | 1/2013 | Bosch ................. | H04W 84/042 |
| | | | 709/245 |
| 2013/0114465 A1* | 5/2013 | McGovern ............. | H04L 41/12 |
| | | | 370/254 |
| 2013/0223221 A1* | 8/2013 | Xu ..................... | H04L 43/0876 |
| | | | 370/235 |
| 2013/0322437 A1* | 12/2013 | Raszuk ................... | H04L 45/04 |
| | | | 370/389 |
| 2014/0115325 A1* | 4/2014 | Detienne ............ | H04L 63/0428 |
| | | | 713/160 |
| 2014/0317276 A1* | 10/2014 | Tie ........................ | H04L 45/306 |
| | | | 709/224 |
| 2014/0341029 A1* | 11/2014 | Allan ..................... | H04L 45/02 |
| | | | 370/235 |
| 2015/0109907 A1* | 4/2015 | Akiya .................. | H04L 47/125 |
| | | | 370/229 |
| 2016/0315853 A1* | 10/2016 | Liste ...................... | H04L 63/10 |
| 2018/0191471 A1* | 7/2018 | Elhaddad ................. | H04L 1/24 |
| 2019/0028381 A1* | 1/2019 | Li ........................... | H04L 45/04 |
| 2020/0322183 A1* | 10/2020 | Lin ...................... | H04L 12/4641 |
| 2021/0021537 A1* | 1/2021 | Yuan ...................... | H04L 45/38 |
| 2021/0385155 A1* | 12/2021 | Suryanarayana ....... | H04L 45/64 |
| 2021/0409336 A1* | 12/2021 | Talur .................... | H04L 67/564 |
| 2022/0345438 A1* | 10/2022 | Mishra ................. | H04L 69/325 |
| 2023/0188461 A1* | 6/2023 | Ponnuru ................. | H04L 45/44 |
| | | | 709/238 |

* cited by examiner

Flow management with
services (consistent hashing)

Branch Network
106

VPC
112

Computer-Readable Medium
102

B-Node
104

S-Nodes
108

V-Node
110

Consistent Hashing
Engine
118

Service
116-1

• • •

Service
116-n

CXP
114

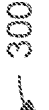
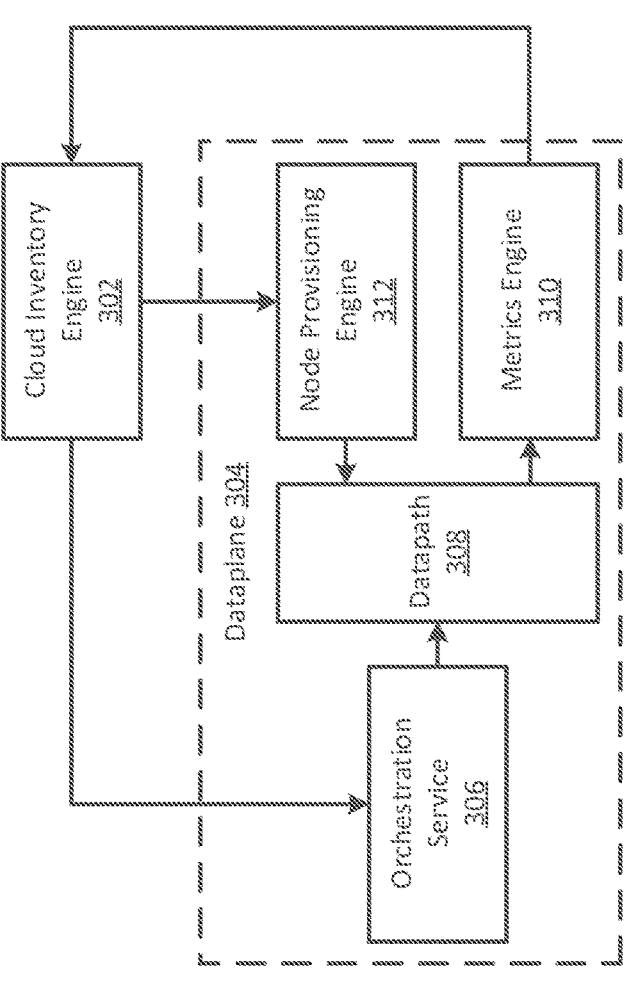
FIG. 3

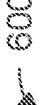
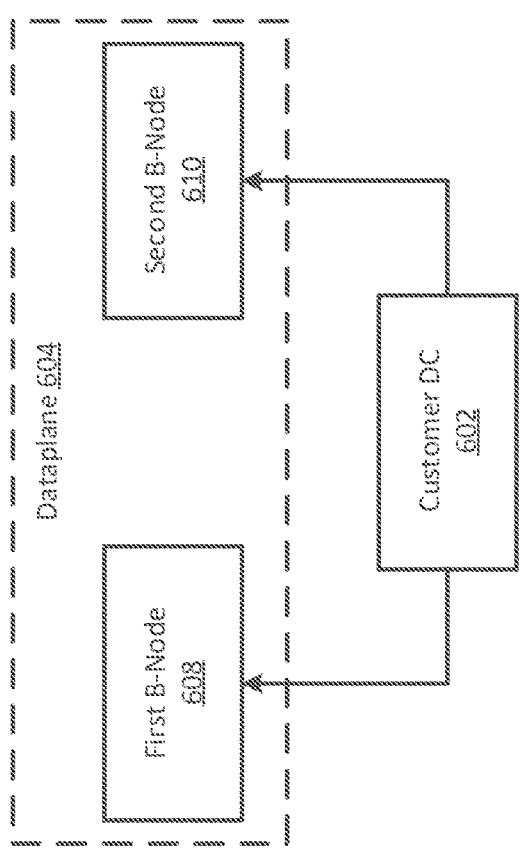
FIG. 6

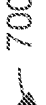
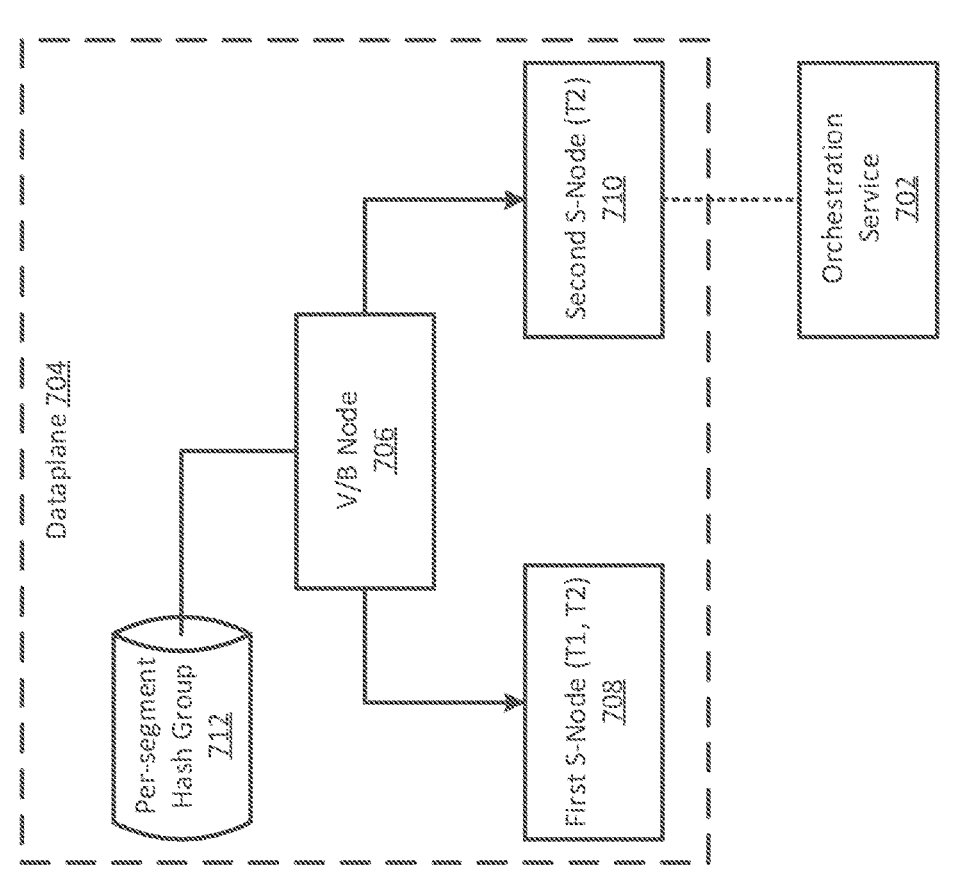
FIG. 7

900

MT-NAT User Interface Engine 910

Destination System 908-1

Destination System 908-N

MT-NAT Subnet Datastore 914

Non-Contiguous Subnets 912

Multi-Tenant Virtual Private Network(s) 902

MT-NAT Engine 904

Source System 906-1

Source System 906-N

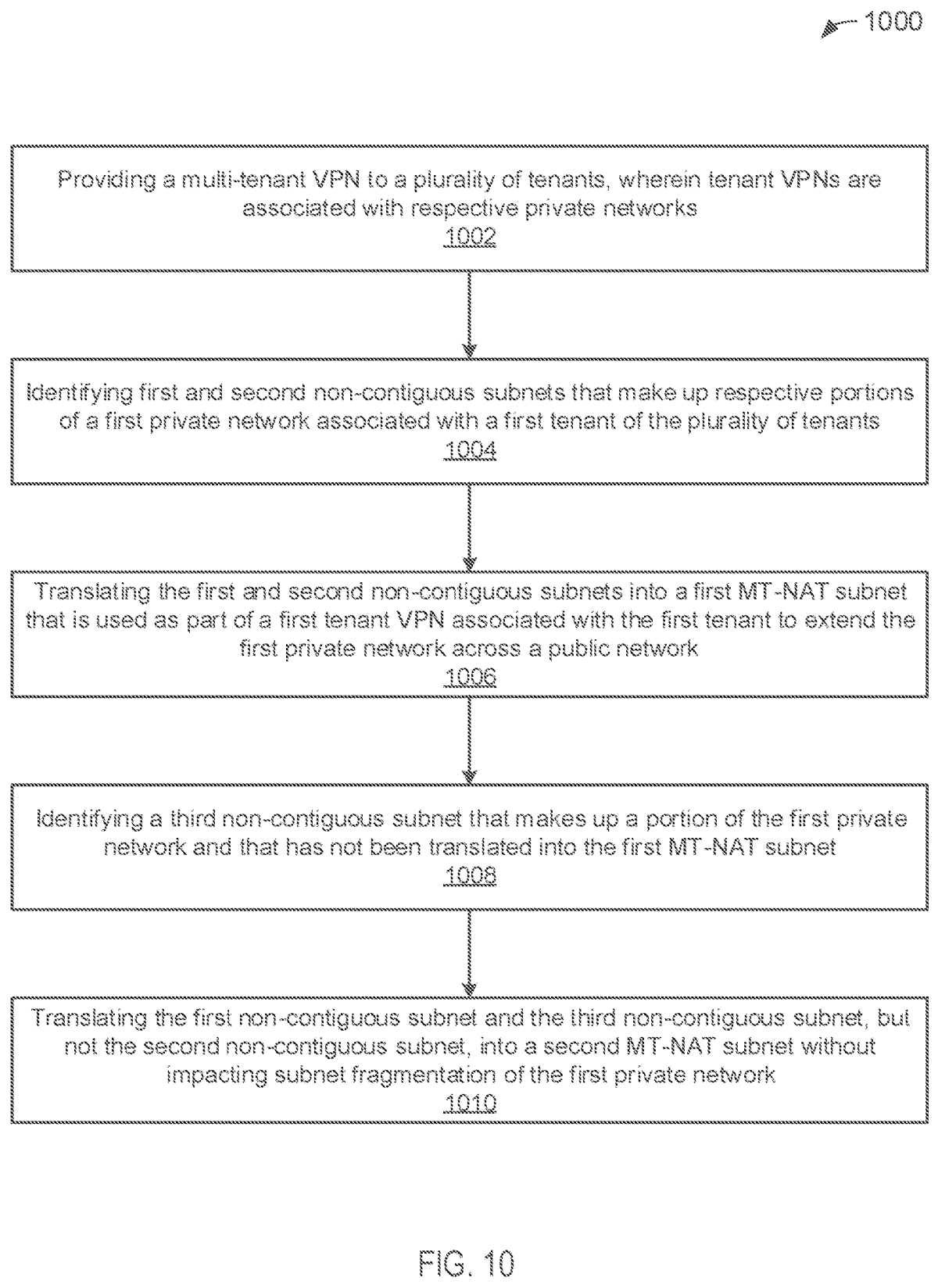

—1000

Providing a multi-tenant VPN to a plurality of tenants, wherein tenant VPNs are associated with respective private networks
1002

Identifying first and second non-contiguous subnets that make up respective portions of a first private network associated with a first tenant of the plurality of tenants
1004

Translating the first and second non-contiguous subnets into a first MT-NAT subnet that is used as part of a first tenant VPN associated with the first tenant to extend the first private network across a public network
1006

Identifying a third non-contiguous subnet that makes up a portion of the first private network and that has not been translated into the first MT-NAT subnet
1008

Translating the first non-contiguous subnet and the third non-contiguous subnet, but not the second non-contiguous subnet, into a second MT-NAT subnet without impacting subnet fragmentation of the first private network
1010

FIG. 10

SYSTEM AND METHOD FOR FLOW CLASSIFICATION IN MULTITENANT VPN NETWORKS

CROSS-REFERENCE TO RELATED APPLICATIONS

The present application claims priority to U.S. Provisional Application No. 63/318,276, entitled "INTERNET FACING APPLICATION," and filed on Mar. 9, 2022, which is incorporated herein by reference.

BACKGROUND

Visibility into aspects of cloud-scaled applications is an area of ongoing research and development. To date, efforts to meet such demand have yielded imperfect results.

SUMMARY

Techniques described in this document provide insight into methods of providing highly available access from internet to applications hosted in public cloud or on-premise. Implementation of the techniques aids efforts to create systems that provide highly available access from internet to applications hosted in public cloud or on-premise.

BRIEF DESCRIPTION OF THE DRAWINGS

FIG. 3 is a diagram of a system with rapid node provisioning.

FIG. 6 is a diagram of a connector autoscaling system.

FIG. 7 is a diagram of a tenant autoscaling system.

FIG. 10 is a flowchart of a method of gateway protocol labeling and routing.

DETAILED DESCRIPTION

Figure 1:
FIG. 1 is a diagram of a system that scales infrastructure as flows increase or decrease.

FIG. 1 is a diagram 100 of a system that scales infrastructure as flows increase or decrease. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, and a virtual private cloud (VPC) 112 coupled to the V-Node 110 through the CRM 102. In the diagram 100, a cloud services exchange platform (CXP) 114 includes the B-node 104, the S-nodes 108, the V-node 110, a service engine 116-1 to a service engine 116-*n* (collectively, the services 116) coupled to the S-nodes 108, and a consistent hashing engine 118 coupled to the B-node 104.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in nontrivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, IP$_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

It may be noted that the term "packet" may refer a formatted unit of data carried by a packet-switched network. In this document, the term is intended to be construed broadly if applicable (e.g., a packet, as used herein, can refer to a layer 2 frame or a layer 4 datagram if that makes sense in a given context). As such, a packet, as used herein, can be considered a formatted unit of data that may or may not be carried by a packet-switched network. If it is desired to refer to the packet strictly as a layer 3 packet, it can be referred to as such (or, e.g., as an IP packet).

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The consistent hashing engine 118 is intended to represent an engine that computes an S-Node index using a function Consistent_Hash (S1, . . . , Sn). In a specific implementation, the CXP 114 has a stateful elastic service plane that is highly redundant and scales horizontally. Thus, the CXP 114 can host stateful services and scale the services horizontally. Stateful services expect forward and reverse traffic of a flow to map to the same service node. Consistent hashing (e.g., google maglev) with flow learning (e.g., AcHash) can be used to meet the packet steering requirements. Ingress and egress nodes compute (via the consistent hashing engine 118) symmetric hash and arrive at the same service plane node for a given flow. Advantageously, addition or removal (including failure) of nodes has minimal impact on existing flows.

In a specific implementation, the consistent hashing engine 118 computes an S-Node index for traffic from branch ("forward flow") and the B-Node 104 steers traffic to a first S-Node of the S-Nodes 108 as described with reference to FIG. 2. In an L3 context a number of hashes equal to the number of S-nodes can be computed for a flow using a 5-tuple from fields in the header of a packet: {source IP address ("src-ip"), destination IP address ("dst-ip"), source port ("src-port"), destination port ("dst-port"), protocol}. Similarly, the consistent hashing engine 118 computes an S-Node index for traffic from cloud ("reverse flow") using symmetric hash and the V-node 110 steers traffic to the first S-Node of the S-Nodes 108 as described with reference to FIG. 2. For example, a symmetric hash can order IP addresses and ports by sorting, so the forward and reverse packets for a flow arrive at the same hash. S-Nodes 108 can use the same technique for steering traffic to firewalls and/or other stateful functions.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, IP$_{SEC}$, etc.), (iii) monitor traffic, (iv) control traffic in accordance with one or more policies (e.g., security policies), etc.

Figure 2:
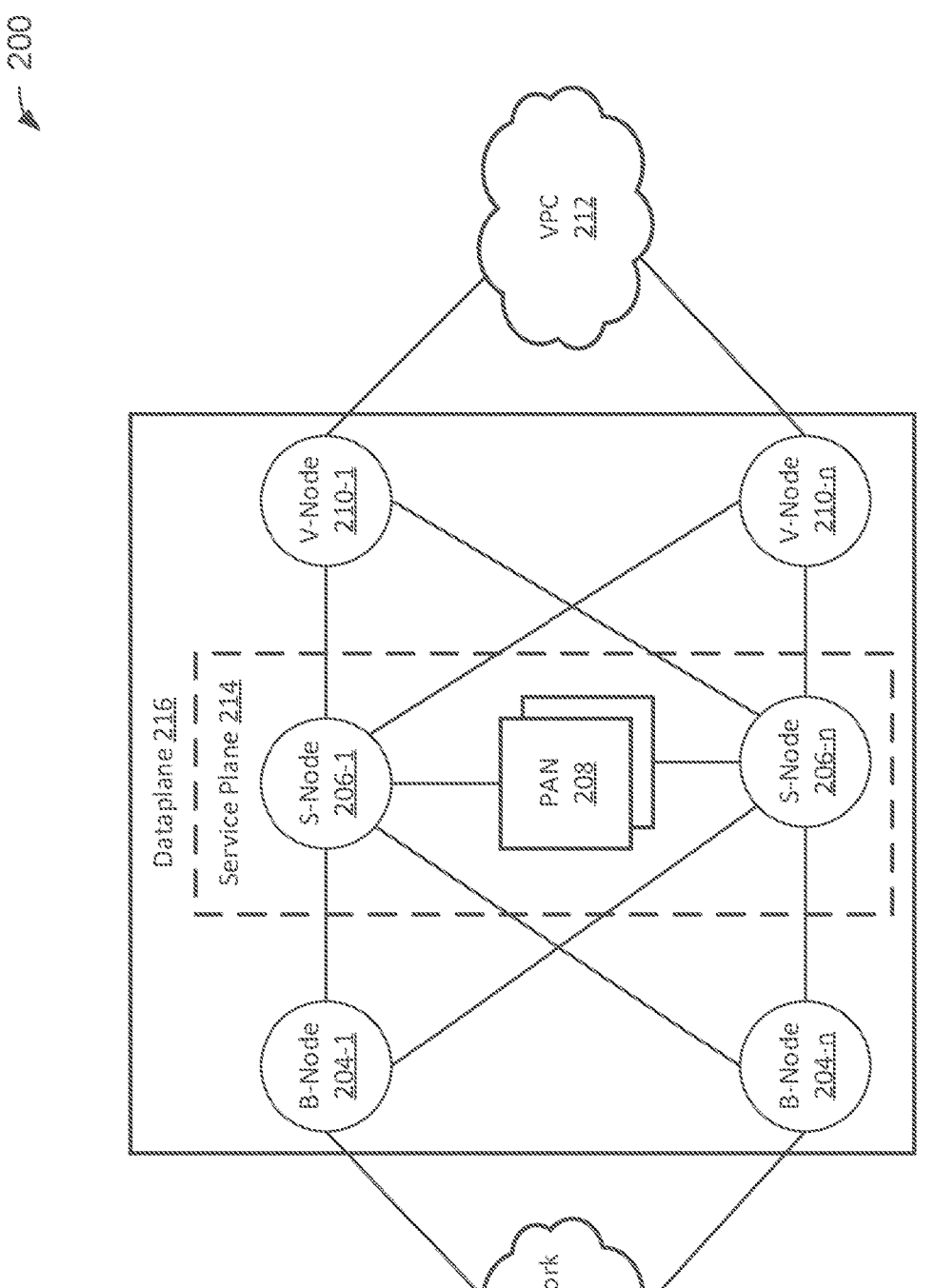
FIG. 2 is a diagram illustrating forward and reverse flows.

FIG. 2 is a diagram 200 illustrating forward and reverse flows. The diagram 200 includes a branch network 202, a B-node 204-1 to a B-node 204-n (collectively, the B-nodes 204) coupled to the branch network 202, an S-node 206-1 to an S-node 206-n (collectively, the S-nodes 206) coupled to the B-nodes 204, processing area networks (PANs) 208 coupled to the S-nodes 206, a V-node 210-1 to a V-node 210-n (collectively, the V-nodes 210) coupled to the S-nodes 206, and a VPC 212 coupled to the V-nodes 210. It may be noted that 'n' may or may not be indicative of the same number of each type of illustrated node.

The branch network 202 is similar to the branch network 104 of FIG. 1 and the VPC 212 is similar to the VPC 112 of FIG. 1. The S-nodes 206 and the PANs 208 can be referred to as a service plane 214. The B-nodes 204, service plane

214, and V-nodes 210 can be referred to as a dataplane 216. As illustrated in the diagram 200, the dataplane 216 operationally connects the branch network 202 to the VPC 212 with multiple sets of nodes. An example of a data plane 216 is an ALKIRA CLOUD SERVICE NODE (CSN)™ dataplane, which is a collection of nodes that moves customer traffic between connectors and through various service functions using a series of overlay tunnels. In a specific implementation, the dataplane 216 is multi-path but supports application identification, stateful policy, and service steering which are stateful functions. The fundamental challenge with multi-path and stateful processing is that the forward and reverse flow of a connection can land in different nodes causing the functionality to break. Accordingly, in the example of FIG. 2, multiple nodes are illustrated.

The B-nodes 204 are intended to represent a collection of engines, including traffic handling engines from connectors to and from the branch network 202. The S-nodes 206 are intended to represent a collection of engines, including engines for executing stateful functions and service steering. The V-nodes 210 are intended to represent a collection of engines, including traffic handling engines from connectors to and from the VPC 212. Each type of node can be independently scaled for resiliency reasons and/or to achieve higher scale, as is described later.

In an example of operation, a forward flow from a source in the branch network 202 (e.g., originating at a client behind an SDWAN) to a destination (e.g., a server) in the VPC 212, for illustrative purposes, traverses the B-node 204-1, the S-node 206-1, and the V-node 210-1. In addition, the forward flow can be characterized as passing from the S-node 206-1 to the PANs 208 and back to the S-node 206-1 before passing to the V-node 210-1.

In this example of operation, a stateful processing reverse flow traverses the V-node 210-1, the S-node 206-1, and the B-node 204-1 when passing from what was the destination (e.g., the server) to what was the source (e.g., the client). In addition, the stateful reverse flow can be characterized as passing from the S-node 206-1 to the PANs 208 and back to the S-node 206-1 before passing to the B-node 204-1. In a specific implementation, stateful reverse flow is achieved by configuring a VB node (e.g., the B-node 204-1 and the V-node 210-1) with an identical set of S-nodes (e.g., the S-nodes 206). Advantageously, if B-node 204-1 goes down, another of the B-nodes 204 can use the hash to maintain flow identity in a stateless way, though flow identity (state) is still maintained on the service plane 214. It may be desirable for the B-nodes 204 to maintain state for efficiency, but there are multiple ingress nodes and a hit node can compute the hash in exactly the same way, making the maintenance of state at the B-nodes 204 optional, assuming an implementation in which the B-nodes 204 are just used for steering traffic.

A system with a stateful flow identity is capable of rapid S-node provisioning. FIG. 3 is a diagram 300 of a system with rapid node provisioning. The diagram 300 includes a cloud resource inventory system 302 and a dataplane 304 coupled to the cloud inventory system 302. The dataplane 304 includes an orchestration service 306 coupled to the cloud resource inventory system 302, a datapath 308 coupled to the orchestration service 306, a metrics engine 310 coupled to the datapath 308 and the cloud resource inventory system 302, and a node provisioning engine 312 coupled to the cloud resource inventory system 302 and the datapath 308.

The cloud resource inventory engine 302 is intended to represent a collection of engines including an application programming interface (API), a tenant provisioning system (TPS), a resource manager, a monitoring engine, and inventory. Inventory can include qualified instance types for various nodes (e.g., v/b nodes, S-nodes, PANs), dataplane limits by provider (e.g., AWS may provide 25 Gbps per VPC and/or other VPC limits), qualified versions/AMI images for $3^{rd}$ party services (e.g., Cisco SDWAN/PAN), and defined constraints for nodes or instance type combinations (e.g., max tenants for an S-node or an oversubscription factor).

The orchestration system 306 is intended to represent a collection of engines including, for example, a capacity planning engine with tenant and connector limits used to dimension the dataplane 308 (leaving room for future growth) and a connector placement engine. In a specific implementation, the capacity planning engine facilitates short-term growth by generating an alert when a load threshold (e.g., 80% capacity) is reached to trigger rapid node provisioning. In a specific implementation, the capacity planning engine facilitates long-term growth by evaluating moving a tenant out to a new dataplane or stretch a dataplane across multiple VPCs. In a specific implementation, the connector placement engine takes advantage of connectors having a desired number of paths defined in inventory (each path modeled as an incoming tunnel to dataplane nodes) to enable a resource manager to pick a least loaded node for tunnel placement. Connectors can be stitched to V- or B-nodes as per desired paths and multiple paths from connectors to the dataplane 308 achieve desired redundancy levels and performance (e.g., via equal cost multipath (ECMP) routing). Tunnels from connectors can be rate limited at ingress and infra-node connectivity is a mesh that can be designed for high availability.

The datapath 308 is intended to represent multiple independently scalable components. In a specific implementation, autoscaling (up or down) of S-nodes has no impact on connectors but each S-node has an associated monetary value that depends upon an associated business model, both to a customer as a value add and to the dataplane provider as a service to the customer. In a specific implementation, autoscaling of V/B nodes or connectors has impact on customers as EIPs are hosted there; because connectors have two paths, one path can be moved to a new node along with EIPs. In a specific implementation, autoscaling tenants impacts S-nodes and PAN; tenants are stretched to new nodes as the tenant grows. In a specific implementation, PAN recommendation guidelines are used to trigger autoscaling of services.

The metrics engine 310 is intended to represent an engine that collects metrics for components of the datapath 308. In a specific implementation, metrics for S-nodes and PAN includes sessions, throughput, descriptor usage, and memory usage; metrics for V/B nodes include throughput; and metrics for connectors include bandwidth. Metrics are provided to the cloud resource inventory engine 302, which informs communications to the orchestration service 306.

The node provisioning engine 312 is intended to represent an engine that autoscales PAN, S-node, connector, tenant, or other components of the datapath 308. As describe previously, consistent hashing facilitates consistent flows (that is, new flows can go through a new S-node but old flows are directed through a specific S-node or redirected if the specific S-node goes down) and stateful service, providing advantages such as scaling infrastructure to match flow (without dropping packets or reducing the risk thereof) without a need to deploy maximum capacity, which is normally challenging with stateful service. Because spinning up a node takes time, it is frequently undesirable to wait for 100% capacity, so a system may be set to spin up a new node at, say, 60% capacity, business intelligence can be used to determine an ideal spin up threshold (e.g., by historical traffic patterns, time of day, day of week, holiday, or the like), or a customer can pay a premium to spin up a new node at a lower threshold than a non-premium customer, typically using a function of cost to the dataplane provider to lower the threshold. It may be noted that node provisioning can include unprovisioning nodes to shrink capacity, which may result in cessation of flows to certain S-nodes. A flow can terminate after a time (e.g., the flow might go away in 10 minutes) and it may be desirable to drop some flows, forcing a restart of the flow, but it is generally desirable to mini- mized the dropping of flows. Depending upon implementa- tion-, configuration-, or preference-specific parameters, cus- tomers could prohibit the dropping of flows, though that would be at a cost to the dataplane provider, which would likely be passed on to the customer. In a specific implemen- tation, one or more baseline S-nodes are up at all times and other S-nodes, which can be referred to as "incremental S-nodes," stay up at least 30 minutes; smaller increments have a cost and you generally don't want to react on spikes but this is balanced against more granularity being better to avoid wasting resources.

Figure 4:
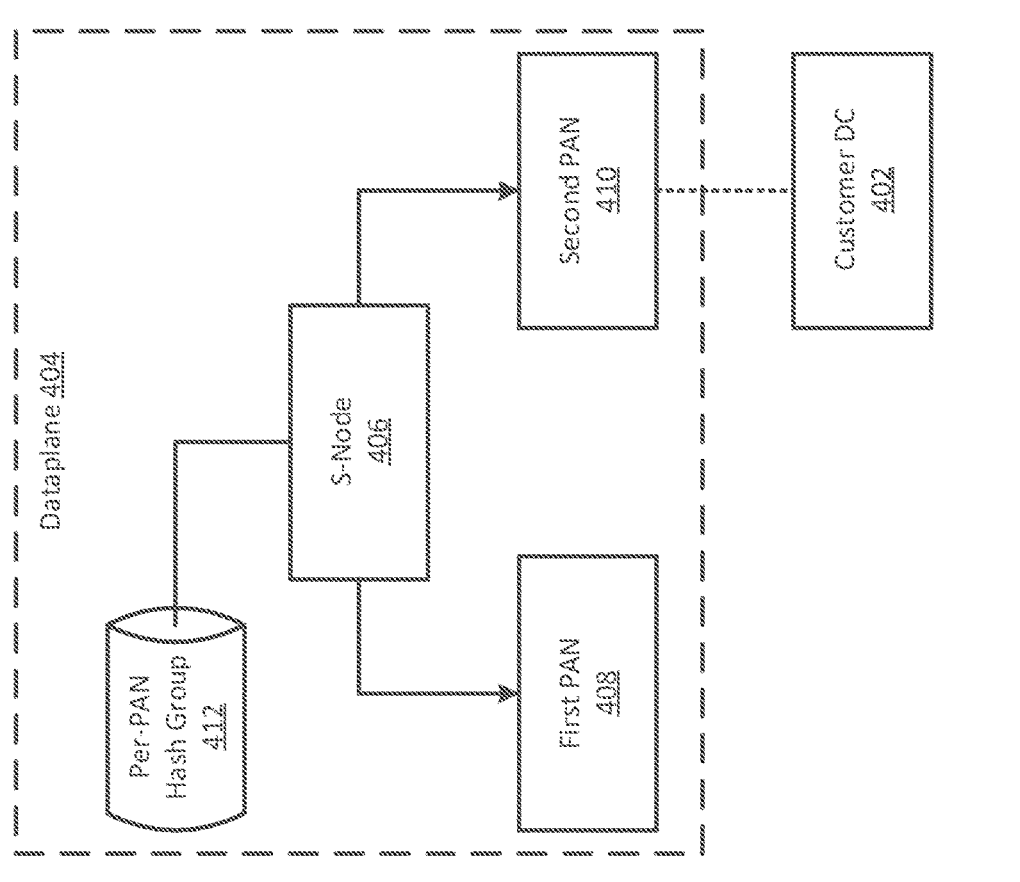
FIG. 4 is a diagram of a PAN autoscaling system.

FIG. 4 is a diagram 400 of a PAN autoscaling system. The diagram 400 includes a customer DC 402 and a dataplane 404 coupled to the customer DC 402. The dataplane 404 includes an S-node 406, a first PAN 408 coupled to the S-node 406, a second PAN 410 coupled to the S-node 406 and the customer DC 402, and a per-PAN hash group datastore 412 coupled to the S-node 406. For illustrative purposes, it is assumed the first PAN 408 is already instan- tiated, the per-PAN hash group datastore 412 includes a consistent hash for the first PAN 408, and the second PAN 410 is instantiated in the manner described in the following paragraph.

In order to autoscale PAN, the second PAN 410 is instantiated and configured to pull policy from the customer DC 402. The second PAN 410 is marked active after the policy download and the second PAN 410 is represented in the per-PAN hash group datastore 412, which maintains hash groups for PANs on S-nodes. Advantageously, autoscaling in this manner ensures existing flows are not adversely affected.

Figure 5:
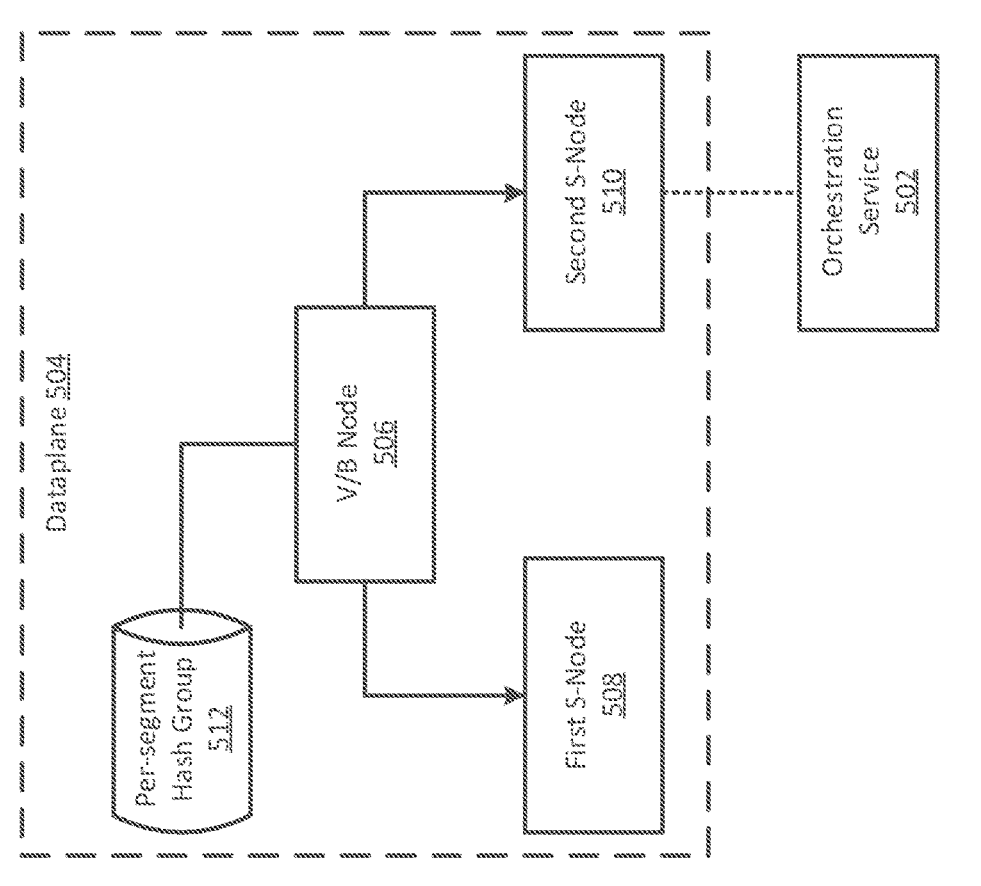
FIG. 5 is a diagram of an S-node autoscaling system.

FIG. 5 is a diagram 500 of an S-node autoscaling system. The diagram 500 includes an orchestration service 502 and a dataplane 504 coupled to the orchestration service 502. The dataplane 504 includes a V/B node 506, a first S-node 508 coupled to the V/B node 506, a second S-node 510 coupled to the V/B node 506 and the orchestration service 502, and a per-segment hash group datastore 512 coupled to the V/B node 506. For illustrative purposes, it is assumed the first S-node 508 is already instantiated, the per-segment hash group datastore 512 includes a consistent hash for segments of the first S-node 508, and the second S-node 510 is instantiated in the manner described in the following para- graph.

In order to autoscale S-node, the second S-node 510 is instantiated, and tenant configuration and policies are con- figured from the orchestration service 502. The second S-node 510 is marked active after tenant and policy con- figuration and segments of the second S-node 510 are represented in the per-segment hash group datastore 512, which maintains hash groups for segments of the S-nodes on V/B nodes. Advantageously, autoscaling in this manner ensures existing flows are not adversely affected.

FIG. 6 is a diagram 600 of a connector autoscaling system. The diagram 600 includes a customer DC 602 and a dataplane 604 coupled to the customer DC 602. The dataplane 604 includes a first B-node 608 and a second B-node 610, both of which are coupled to the customer DC 602. Unlike autoscaling described in the previous figures, scale-out has been found to work poorly for connectors; scale-up works better. Connectors have multiple paths (tun- nels) into the dataplane 604. Connector bandwidth can be monitored to scale up connectors.

FIG. 7 is a diagram 700 of a tenant autoscaling system. The diagram 700 includes an orchestration service 702 and a dataplane 704 coupled to the orchestration service 702. The dataplane 704 includes a V/B node 706, a first S-node 708 coupled to the V/B node 706, a second S-node 710 coupled to the V/B node 706 and the orchestration service 702, and a per-segment hash group datastore 712 coupled to the V/B node 706. For illustrative purposes, it is assumed the first S-node 708 is already instantiated for two tenants, T1 and T2, the per-segment hash group datastore 712 includes a consistent hash for segments of the first S-node 708, and the second S-node 710 is instantiated in the manner described in the following paragraph.

In order to autoscale tenants, the second S-node 710 is instantiated for the tenant T2, and tenant configuration and policies are configured from the orchestration service 702 for the tenant T2. In a specific implementation, the second S-node 710 can be an already instantiated S-node capable of handling incremental capacity associated with the tenant T2. The second S-node 710 is marked active after tenant and policy configuration and segments of the second S-node 710 are represented in the per-segment hash group datastore 712, which maintains hash groups for segments of the S-nodes that belong to a tenant on V/B nodes. Advantageously, autoscaling in this manner ensures existing flows are not adversely affected.

Figure 8:
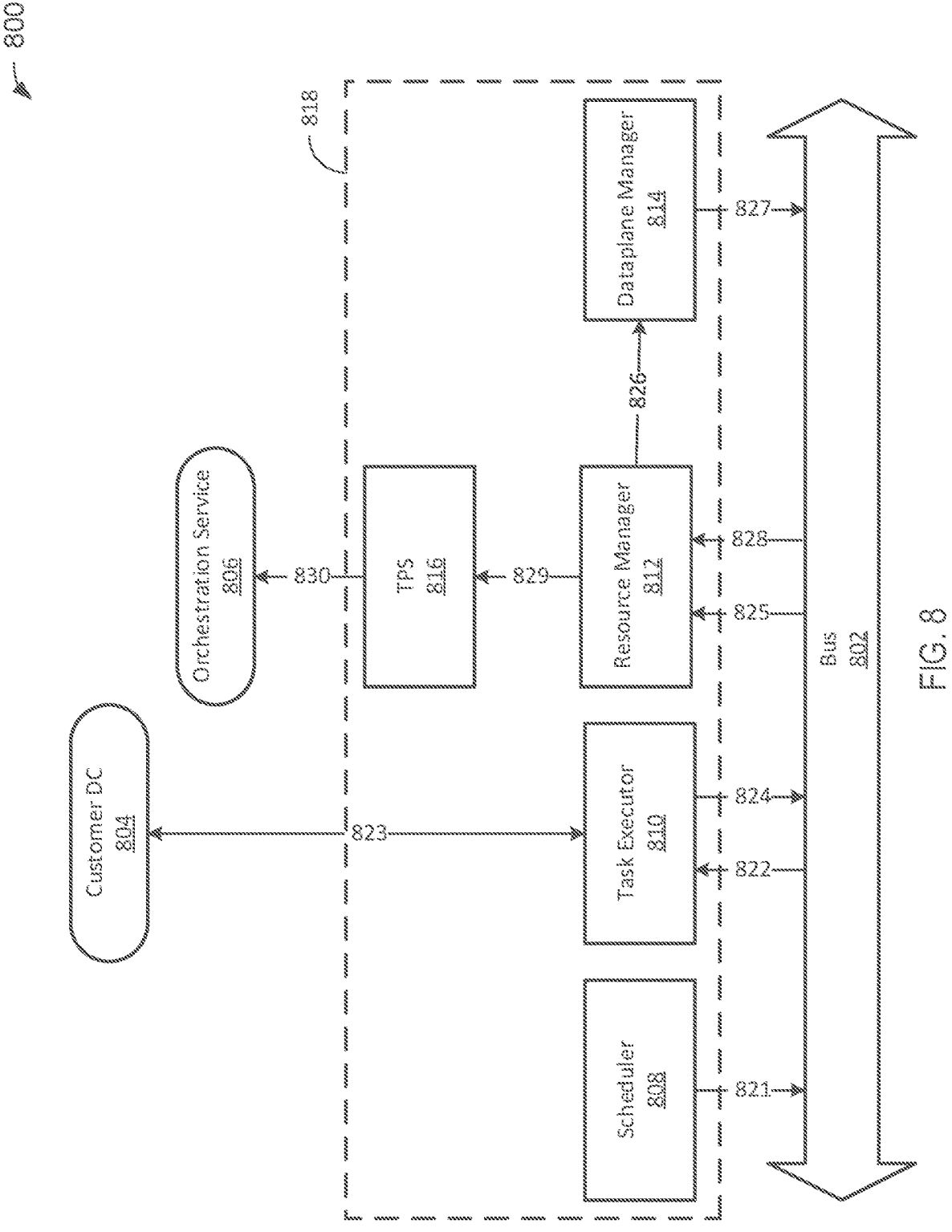
FIG. 8 is a diagram of a cloud inventory engine.

A cloud inventory engine, specifically the cloud inventory engine 302, was described with reference to FIG. 3. FIG. 8 is a diagram 800 of a cloud inventory engine. The diagram 800 includes a bus 802, a customer DC 804, and an orchestrator service 806 that may or may not be considered part of the cloud inventory engine (and the latter two are conceptually excluded in the example of FIG. 3). Included in the cloud inventory engine are a scheduler 808, a task executor 810, a resource manager 812, a dataplane manager 814, and a TPS 816, which are encompassed by the dashed box 818 for illustrative purposes. The arrows 821 to 830 represent the order of operations within (and to/from) the cloud inventory engine.

The scheduler 808 drops a task onto the bus 802, which, in a specific implementation, is a Kafka data bus, that is picked up by the task executor 810. The task executor 810 communicates with the customer DC 804 (e.g., an event monitoring and alerting engine, such as Prometheus) then drops a task onto the bus 802 that is picked up by the resource manager 812. The resource manager 812 provides information to the dataplane manager 814 that enables a decision regarding what task is needed on the dataplane and causes the dataplane manager 814 to drop a task onto the bus 802 to be picked up by the resource manager 812. The resource manager 812 provides information to the TPS 814, which communicates with the orchestration service 816 (which then takes relevant action on the dataplane).

Figure 9:
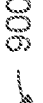
FIG. 9 is a diagram of a system for multi-tenant virtual private network (VPN) gateway protocol labeling and routing.

FIG. 9 is a diagram 900 of a system for multitenant virtual private network (VPN) gateway protocol labeling and rout- ing. The diagram 900 includes a multitenant VPN 902, a multitenant VPN gateway protocol labeling engine 904 coupled to the multi-tenant VPN 902, source systems 906-1 to 906-N (individually, the source system 906, collectively, the source systems 906) coupled to the multitenant VPN 902, destination systems 908-1 to 908-N (individually, the destination system 908, collectively, the destination systems 908) coupled to the multitenant VPN 902, a flow characteristic datastore 910 coupled to the multitenant VPN 902, a flow routing datastore 912 coupled to the multitenant VPN 902, a multitenant VPN gateway protocol routing engine 914 coupled to the multitenant VPN 902, and an autonomous branch network multitenant VPN user interface engine 916 coupled to the multitenant VPN 902.

The multitenant VPN 902 is intended to represent one or more virtual private networks including and/or supporting multi-tenant architectures. For example, a tenant can be a group of one or more users or systems who can share access to a single instance of a system or a single instance of an application executing on a system. In one example, a tenant can be a customer (or a customer's representative) or a group of customers (or customer representatives).

In a specific implementation, the multitenant VPN 902 can include a plurality of access points and/or multiple subsets of access points. In one example, the multitenant VPN 902 comprises a plurality of distinct virtual private networks, and each of the distinct virtual private networks can be associated with a particular tenant of the multi-tenant architecture. It will be appreciated that, in some embodiments, reference to a multi-tenant virtual private network can refer to the entire multitenant VPN 902 and/or portions thereof (e.g., one or more virtual private networks of the multitenant VPN 902).

The multitenant VPN gateway protocol labeling engine 904 is intended to represent an engine that labels flows (e.g., of the multitenant VPN 902). In a specific implementation, the multitenant VPN gateway protocol labeling engine 904 and/or the multitenant VPN 902 is software-based (e.g., as opposed to hardware-based). In a software-based implementation, the system can achieve improved flexibility relative to traditional networking. For example, the multitenant VPN gateway protocol labeling engine 904 can allow administrators, e.g., via the autonomous branch network multitenant VPN user interface engine 916, to control the multitenant VPN 902, change configuration settings, provision resources, assign network addresses (e.g., IP addresses, IP prefixes) and/or microsegments for flows and/or users, and increase network capacity.

In a specific implementation, it will be appreciated that the multitenant VPN gateway protocol labeling engine 904 can perform the functions described herein within one or more virtual private networks, other types of private networks, multi-tenant networks, and/or the like. Accordingly, for example, the multitenant VPN gateway protocol labeling engine 904 can function to perform operations in parallel across one or more virtual private networks. For example, operations executed with respect a particular tenant and/or a particular flow (e.g., in a particular virtual private network of the multitenant VPN 902) can be performed in parallel with operations executed with respect to another tenant and/or another flow (e.g., in another virtual private network of the multitenant VPN 902).

In a specific implementation, the multitenant VPN gateway protocol labeling engine 904 can function to tag packets (of a flow). More specifically, the multitenant VPN gateway protocol labeling engine 904 can function to simultaneously and/or in parallel tag flows for each tenant of the multitenant VPN 902 and across one or more networks of the multitenant VPN 902. For example, the multitenant VPN gateway protocol labeling engine 904 can apply first routing tags to packets that are associated with a first flow and second routing tags to packets that are associated with a second flow. The multitenant VPN gateway protocol labeling engine 904 can facilitate the tracking of flows, determine flow paths from source systems 906 to destination systems 908, determine reverse flow paths from destination systems 908 to source systems 906, and/or the like.

In a specific implementation, the multitenant VPN gateway protocol labeling engine 904 captures flow characteristics, such as source information, destination information, timestamps, subnet information, virtual private network information, tenant information, process information, transformation information, resource information, flow path, return flow path, subnet information, microsegment information, and/or the like for storing, updating or otherwise managing flow characteristics in the flow characteristics datastore 910. In a specific implementation, the multitenant VPN gateway protocol labeling engine 904 can function to categorize flows. For example, the multi-tenant VPN gateway protocol labeling engine 904 can categorize flows based on flow characteristics. Categories can include, for example, user groups (e.g., a sales group), users or user groups having particular permissions (e.g., permission to access various resources or network locations), and/or the like.

In a specific implementation, the multitenant VPN gateway protocol routing engine 914 maintains a routing table (e.g., including tag information), represented in the example of FIG. 9 as the routing datastore 912. In a specific implementation, the multitenant VPN gateway protocol routing engine 914 can function to generate, transmit, and/or receive notifications. For example, the multitenant VPN gateway protocol routing engine 914 can function to notify tenants, customers, and/or administrators of flow path information, flow characteristics, policy information, policy enforcement information, and/or the like. In a specific implementation, the multitenant VPN gateway protocol routing engine 914 can function to enforce policies on flows. Policies can include security policies, routing policies (e.g., associated with a routing table), bandwidth throttling policies, resource access/restriction policies, and/or other policies implementing features described above and elsewhere herein. In a specific implementation, the multitenant VPN gateway protocol routing engine 914 can function to transmits and receive data. For example, the multitenant VPN gateway protocol routing engine 914 can access the flow characteristic datastore 910, provide routing (or flow) data to the autonomous branch network multitenant VPN user interface engine 916 and vice versa, receive policies from the autonomous branch network multitenant VPN user interface engine 916, and/or the like.

The autonomous branch network multitenant VPN user interface engine 916 is intended to represent an engine that allows users (e.g., administrators, developers) to control and/or interface with the multitenant VPN 902, and systems and engines associated therewith (e.g., the multitenant VPN gateway protocol labeling engine 904 and the multitenant VPN gateway protocol routing engine 914). In a specific implementation, the autonomous branch network multitenant VPN user interface engine 916 can allow users to control the multitenant VPN 902 (by interacting the multitenant VPN gateway protocol routing engine 914), assign network addresses and/or microsegments (e.g., to flows, users), change configuration settings, define policies, provision resources, and increase network capacity. In a specific implementation, the autonomous branch network multitenant VPN user interface engine 916 provides a graphical user interface that allows users to interact with the multitenant VPN gateway protocol routing engine 914 to perform some or all of the functions of the multitenant VPN gateway protocol routing engine 914.

FIG. 10 is a flowchart 1000 of an example of a method of gateway protocol labeling and routing. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

The flowchart 1000 starts at module 1002 with configuring a B-node router as a first exterior Border Gateway Protocol (eBGP) peer for a VPN tunnel through a multitenant VPN network. In a specific implementation, the B-node router is implemented at the edge of an autonomous branch network, though the B-node router can be physically located either on the branch network, on a cloud exchange platform network, or a cloud. In extreme cases, an autonomous branch network could be little more than multiple edge devices coupled to the B—node router on a service-provider's network. More typically, the B-node router is at the edge of the autonomous branch network and coupled to a B-node of a cloud exchange platform. Although the multitenant VPN network has multiple tenants, a tenant can ignore the underlying complexity of the multitenant VPN network and configure the first eBGP peer (e.g., via an autonomous branch network multitenant VPN user interface) with network policies and rule sets that are enabled by a multitenant VPN gateway protocol labeling engine and enforced by a multitenant VPN gateway protocol routing engine.

The flowchart 1000 continues to module 1004 with configuring an S-node router as a second eBGP peer for the VPN tunnel through the multitenant VPN network. In a specific implementation, the S-node router is located at the edge of a service provisioning network. By configuring the second eBGP peer to ensure information provided in tags applied at the B-node (e.g., an identification of a first subnet) is not forgotten, policy can be enforced across flows over the multitenant VPN network. It may be noted that tags can also be applied at the S-node router and recognized at the B-node router or a policy enforcement engine.

The flowchart 1000 continues to module 1006 with tagging a first packet, bound for the S-node through the VPN tunnel of the multitenant VPN network via the B-node router, with a first tag. As mentioned above, the reverse (e.g., tagging the first packet bound for the B-node through the VPN tunnel via the S-node router) is also possible. In a specific implementation, the tagging of the first packet can be accomplished by a multitenant VPN gateway protocol labeling engine at the B-node router. In alternatives, labeling can occur before or after the first packet reaches the B-node router. For example, the B-node router can receive an IP packet that is already tagged (and identifiable as part of a flow) or pass the IP packet on to a labeling engine to tag the IP packet (identifying it as part of a flow).

The flowchart 1000 continues to module 1008 with associating the first tag with a first flow through the multitenant VPN network. By recognizing a packet as part of the first flow, policy associated with the first flow can be applied to the first packet in the VPN tunnel (e.g., by the B-node router, the S-node router, and intervening appropriately configured network devices, if any).

The flowchart 1000 continues to decision point 1010 where it is determined whether a second packet has the first tag. If it is determined the second packet has the first tag (1010—Yes), then the flowchart 1000 continues to module 1012 with identifying the second packet, bound for the B-node through the VPN tunnel via the S-node, with the first flow and to module 1014 with running eBGP pairing within the VPN tunnel with the first eBGP peer and the second eBGP peer. If, on the other hand, it is determined the second packet does not have the first tag (1010—No), then the flowchart 1000 continues to module 1016 with identifying the second packet with a second flow and to module 1014 as described previously.

Figure 11:
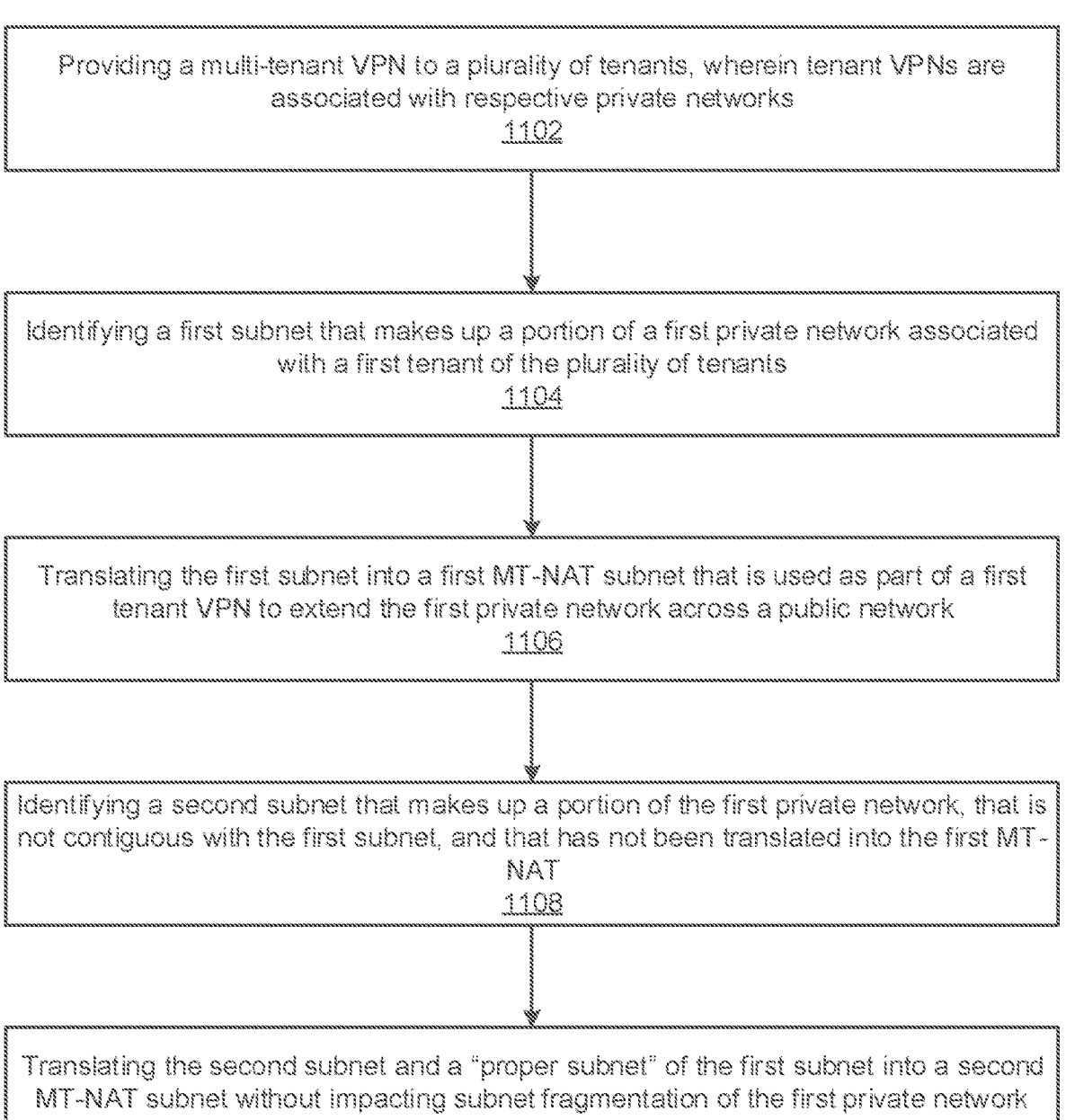
FIG. 11 is a flowchart of an example of a method of gateway protocol labeling and routing.

FIG. 11 is a flowchart 1100 of an example of a method of gateway protocol labeling and routing. The flowchart 1100 starts at module 1102 with configuring a B-node router as a first eBGP peer for a VPN tunnel through a multitenant VPN network. In a specific implementation, the B-node router is implemented at the edge of an autonomous branch network, though the B-node router can be physically located either on the branch network, on a cloud exchange platform network, or a cloud. In extreme cases, an autonomous branch network could be little more than multiple edge devices coupled to the B-node router on a service-provider's network. More typically, the B-node router is at the edge of the autonomous branch network and coupled to a B-node of a cloud exchange platform. Although the multitenant VPN network has multiple tenants, a tenant can ignore the underlying complexity of the multitenant VPN network and configure the first eBGP peer (e.g., via an autonomous branch network multitenant VPN user interface) with network policies and rule sets that are enabled by a multitenant VPN gateway protocol labeling engine and enforced by a multitenant VPN gateway protocol routing engine.

The flowchart 1100 continues to module 1104 with configuring a V-node router as a second eBGP peer for the VPN tunnel through the multitenant VPN network. In a specific implementation, the V-node router is located at the edge of a cloud network. By configuring the second eBGP peer to ensure information provided in tags applied at the B-node (e.g., an identification of a first subnet) is not forgotten, policy can be enforced across flows over the multitenant VPN network. It may be noted that tags can also be applied at the V-node router and recognized at the B-node router or a policy enforcement engine.

The flowchart 1100 continues to module 1106 with tagging a first packet, bound for the V-node through the VPN tunnel of the multitenant VPN network via the B-node router, with a first tag. As mentioned above, the reverse (e.g., tagging the first packet bound for the B-node through the VPN tunnel via the V-node router) is also possible. In a specific implementation, the tagging of the first packet can be accomplished by a multitenant VPN gateway protocol labeling engine at the B-node router. In alternatives, labeling can occur before or after the first packet reaches the B-node router. For example, the B-node router can receive an IP packet that is already tagged (and identifiable as part of a flow) or pass the IP packet on to a labeling engine to tag the IP packet (identifying it as part of a flow).

The flowchart 1100 continues to module 1108 with associating the first tag with a first flow through the multitenant VPN network. By recognizing a packet as part of the first flow, policy associated with the first flow can be applied to the first packet in the VPN tunnel (e.g., by the B-node router, the V-node router, and intervening appropriately configured network devices, if any).

The flowchart 1100 continues to decision point 1110 where it is determined whether a second packet has the first tag. If it is determined the second packet has the first tag (1110—Yes), then the flowchart 1100 continues to module 1112 with identifying the second packet, bound for the B-node through the VPN tunnel via the V-node, with the first flow and to module 1114 with running eBGP pairing within the VPN tunnel with the first eBGP peer and the second eBGP peer. If, on the other hand, it is determined the second packet does not have the first tag (1110—No), then the flowchart 1100 continues to module 1116 with identifying the second packet with a second flow and to module 1114 as described previously.

Figure 12:
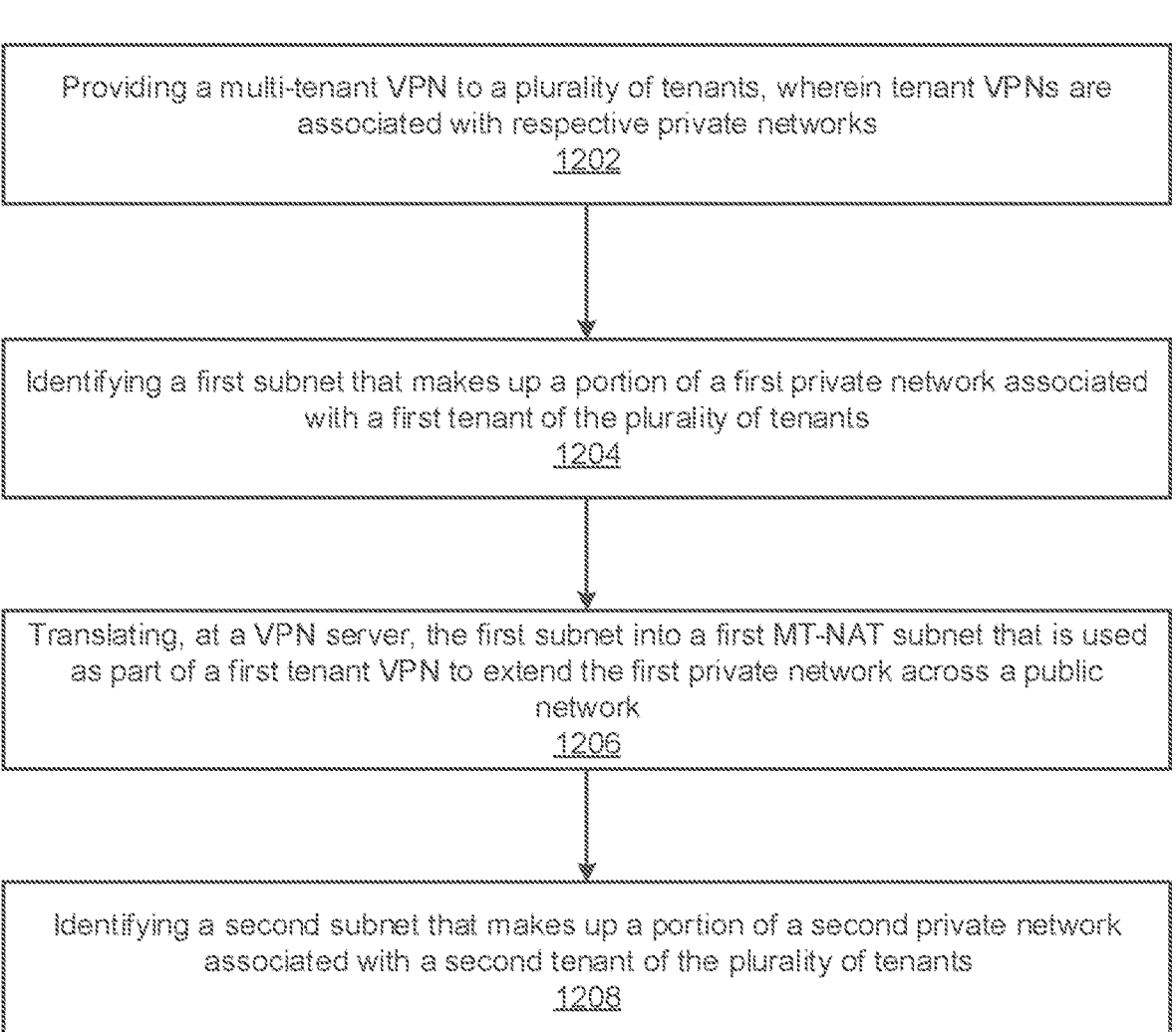
FIG. 12 is a flowchart of an example of a method of gateway protocol labeling and routing.

FIG. 12 is a flowchart 1200 of an example of a method of gateway protocol labeling and routing. The flowchart 1200 starts at module 1202 with configuring a V-node router as a first eBGP peer for a VPN tunnel through a multitenant VPN network. In a specific implementation, the V-node router is located at the edge of a cloud network. By configuring the second eBGP peer to ensure information provided in tags applied at the V-node (e.g., an identification of a first subnet) is not forgotten, policy can be enforced across flows over the multitenant VPN network. It may be noted that tags can also be applied at the S-node router and recognized at the V-node router.

The flowchart 1200 continues to module 1204 with configuring an S-node router as a second eBGP peer for the VPN tunnel through the multitenant VPN network. In a specific implementation, the S-node router is located at the edge of a service provisioning network. By configuring the second eBGP peer to ensure information provided in tags applied at the V-node is not forgotten, policy can be enforced across flows over the multitenant VPN network. It may be noted that tags can also be applied at the S-node router and recognized at the V-node router or a policy enforcement engine.

The flowchart 1200 continues to module 1206 with tagging a first packet, bound for the S-node through the VPN tunnel of the multitenant VPN network via the V-node router, with a first tag. As mentioned above, the reverse (e.g., tagging the first packet bound for the V-node through the VPN tunnel via the S-node router) is also possible. In a specific implementation, the tagging of the first packet can be accomplished by a multitenant VPN gateway protocol labeling engine at the V-node router. In alternatives, labeling can occur before or after the first packet reaches the V-node router. For example, the V-node router can receive an IP packet that is already tagged (and identifiable as part of a flow) or pass the IP packet on to a labeling engine to tag the IP packet (identifying it as part of a flow).

The flowchart 1200 continues to module 1208 with associating the first tag with a first flow through the multitenant VPN network. By recognizing a packet as part of the first flow, policy associated with the first flow can be applied to the first packet in the VPN tunnel (e.g., by the V-node router, the S-node router, and intervening appropriately configured network devices, if any).

The flowchart 1200 continues to decision point 1210 where it is determined whether a second packet has the first tag. If it is determined the second packet has the first tag (1210—Yes), then the flowchart 1200 continues to module 1212 with identifying the second packet, bound for the V-node through the VPN tunnel via the S-node, with the first flow and to module 1214 with running eBGP pairing within the VPN tunnel with the first eBGP peer and the second eBGP peer. If, on the other hand, it is determined the second packet does not have the first tag (1210—No), then the flowchart 1200 continues to module 1216 with identifying the second packet with a second flow and to module 1214 as described previously.

Figure 13:
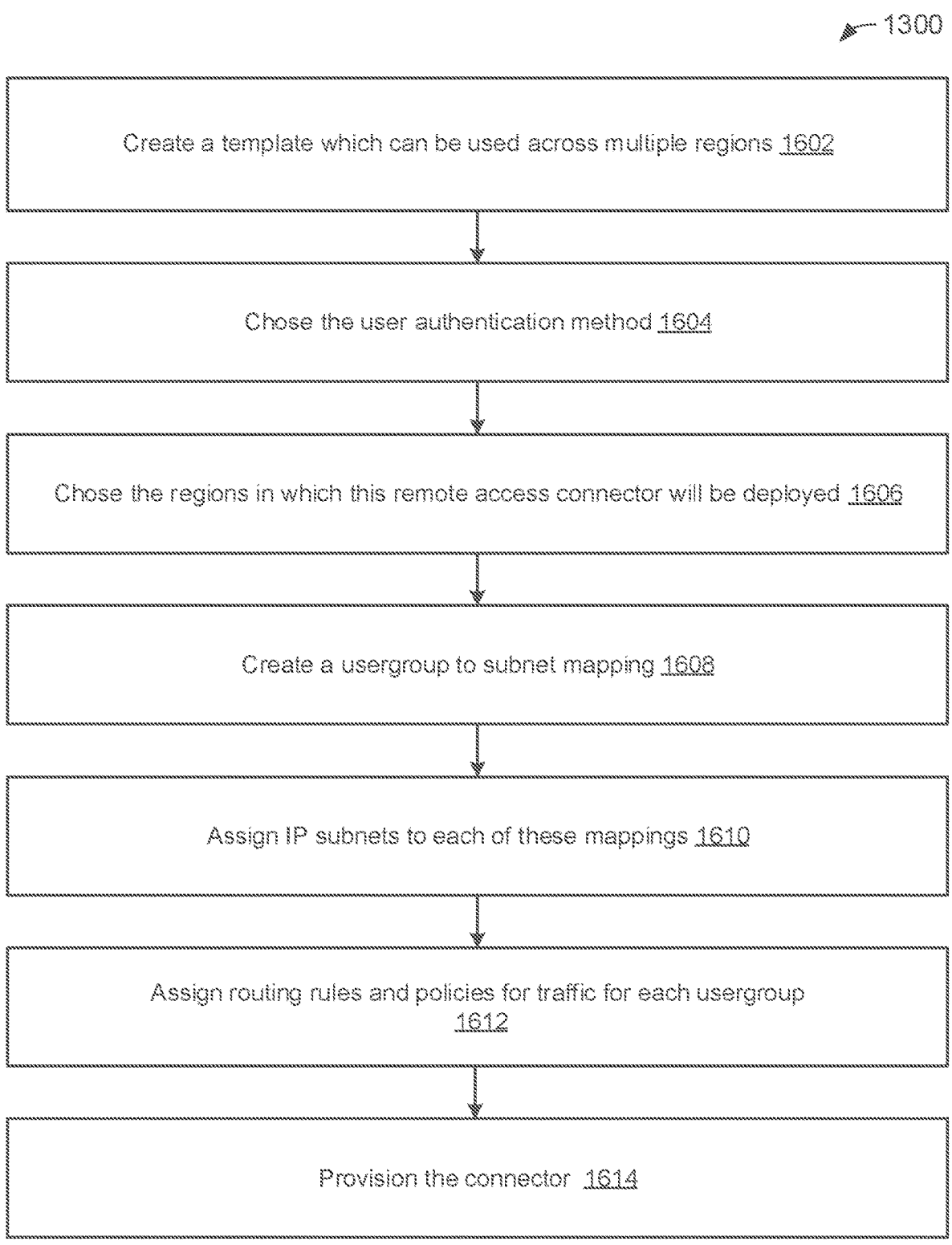
FIG. 13 is a diagram of an example of a system with multitenant VPN BGP functionality.

FIG. 13 is a diagram 1300 of an example of a system with multitenant VPN BGP functionality. The diagram 1300 includes an autonomous branch network 1302-1 to an autonomous branch network 1302-n (collectively, the autonomous branch networks 1302); a multitenant VPN spanning branch-side eBGP peer 1304-1 coupled to the autonomous branch network 1302-1 to a multitenant VPN spanning branch-side eBGP peer 1304-n coupled to the autonomous branch network 1302-n (collectively, the multitenant VPN spanning branch-side eBGP peers 1304); a multitenant VPN 1306 coupled to the multitenant VPN spanning branch-side eBGP peers 1304; a multitenant VPN spanning service-side eBGP peer 1308-1 to a multitenant VPN spanning service-side eBGP peer 1308-n (collectively, the multitenant VPN spanning service-side eBGP peers 1308) coupled to the multitenant VPN 1306; and a service provider network 1310-1 coupled to the multitenant VPN spanning service-side eBGP peer 1308-1 to a service provider network 1310-n coupled to the multitenant VPN spanning service-side eBGP peer 1308-n (collectively, the service provider networks 1310).

The autonomous branch networks 1302 are intended to represent customer networks. In the example of FIG. 13, a customer network is an autonomous system (AS). An AS is a collection of connected Internet Protocol (IP) routing prefixes under the control of one or more network operators on behalf of a single administrative entity or domain, that presents a common and clearly defined routing policy to the Internet. Each AS is assigned an autonomous system number (ASN), for use in Border Gateway Protocol (BGP) routing. Autonomous System Numbers are assigned to Local Internet Registries (LIRs) and end user organizations by their respective Regional Internet Registries (RIRs), which in turn receive blocks of ASNs for reassignment from the Internet Assigned Numbers Authority (LANA). The IANA also maintains a registry of ASNs which are reserved for private use (and should therefore not be announced to the global Internet).

BGP neighbors, or peers, are established by configuration among routers to create a TCP session on port 179. A BGP speaker sends 19-byte keep-alive messages every 60 seconds to maintain the connection. When BGP runs between two peers in the same AS, it is referred to as Internal BGP (iBGP or Interior Border Gateway Protocol). When it runs between different autonomous systems, it is called External BGP (eBGP or Exterior Border Gateway Protocol). Routers on the boundary of one AS exchanging information with another AS are called border or edge routers or simply eBGP peers and are typically connected directly, while iBGP peers can be interconnected through other intermediate routers. The main difference between iBGP and eBGP peering is in the way routes that were received from one peer are propagated to other peers. For instance, new routes learned from an eBGP peer are typically redistributed to all iBGP peers as well as all other eBGP peers (if transit mode is enabled on the router). However, if new routes are learned on an iBGP peering, then they are re-advertised only to all eBGP peers. These route-propagation rules effectively require that all iBGP peers inside an AS are interconnected in a full mesh.

The multitenant VPN spanning branch-side eBGP peers 1304 are intended to represent border routers of the respective autonomous branch networks 1302. eBGP peering can be run inside a VPN tunnel, allowing two remote sites to exchange routing information in a secure and isolated manner. How routes are propagated can be controlled in detail via the route-maps mechanism. This mechanism consists of a set of rules. Each rule describes, for routes matching some given criteria, what action should be taken. The action could be to drop the route, or it could be to modify some attributes of the route before inserting it in a routing table.

The multitenant VPN 1306 is intended to represent a cloud exchange network and multiple cloud networks stitched together by the cloud exchange. In a specific implementation, the multitenant VPN spanning branch-side eBGP peers 1304 are implemented on the autonomous branch networks 1302, but in an alternative, one or more of them are implemented on a cloud exchange platform (in the multitenant VPN 1306). Similarly, in a specific implementation, the multitenant VPN spanning service-side eBGP peers 1308 are implemented on the service provider networks 1310, but in an alternative, one or more of them are implemented on the cloud exchange platform.

The multitenant VPN spanning service-side eBGP peers 1308 are intended to represent border routers of the respective service provider networks 1310. For illustrative purposes, the multitenant VPN spanning service-side eBGP peers 1308 are coupled to the multitenant VPN spanning branch-side eBGP peers 1304 through the multitenant VPN 1306. As such, an autonomous branch network of the autonomous branch networks 1302 can be coupled to a service provider network of the service provider networks 1310 via a VPN tunnel that passes through the multitenant VPN 1306; a multitenant VPN spanning branch-side eBGP peer of the multitenant VPN spanning branch-side eBGP peers 1304 and a multitenant VPN spanning service-side eBGP peer of the multitenant VPN spanning service-side eBGP peers 1308 are peered inside the VPN tunnel. It may be noted that a virtual point-to-point connection through the use of dedicated circuits can be used to create a VPN, as well.

The service provider networks 1310 are intended to represent network devices (e.g., servers) that provide services for networked devices coupled to one of the service provider networks 1310 through one of the multitenant VPN spanning branch-side eBGP peers 1304. It may be noted that FIG. 13 implies each of the service provider networks 1310 has a respective one of the multitenant VPN spanning service-side eBGP peers 1308, but to the extent one of the service provider networks 1308 is not an AS (or for some other reason), it may share one of the eBGP peers with another one of the service provider networks 1308.

What is claimed is:
1. A system comprising:
one or more processors; and
memory storing instructions that, when executed by the one or more processors, cause the system to perform:
computing a symmetric hash value based on packet header fields including source IP address, destination IP address, source port, destination port, and protocol field, wherein the symmetric hash is computed by sorting at least the IP addresses and port numbers of the packet header fields prior to hashing, such that both forward and reverse packets associated with a flow are mapped to a common service point attachment node (S-node);
selecting the S-node based on the symmetric hash;
configuring a branch node (B-node) router as a first exterior Border Gateway Protocol (eBGP) peer for a virtual private network (VPN) tunnel through a multitenant VPN network;

configuring a service node (S-node) router as a second eBGP peer for the VPN tunnel through the multitenant VPN network, wherein the S-node router is configured to preserve information carried in tags applied at the B-node router such that the tag information is not forgotten across the VPN tunnel, thereby enabling enforcement of policy associated with the flow across the multitenant VPN network;
tagging a first packet of the flow, bound for the selected S-node through the VPN tunnel of the multitenant VPN network via the B-node router, with a first tag;
associating the first tag with the flow through the multitenant VPN network, wherein the association enables maintaining flow identity during scaling of S-nodes by employing a consistent hashing function;
determining whether a second packet, received from a service provider via the S-node and bound for the B-node through the VPN tunnel, has the first tag;
when the second packet has the first tag, identifying the second packet as belonging to the flow, and responsive to identifying the second packet as belonging to the flow based on the first tag, running eBGP pairing within the VPN tunnel between the first eBGP peer and the second eBGP peer; and
when the second packet does not have the first tag, identifying the second packet as belonging to a different flow.
2. The system of claim 1, wherein the instructions further cause the system to perform: configuring a multitenant VPN spanning branch-side exterior Border Gateway Protocol (eBGP) peer at the edge of an autonomous branch network.
3. The system of claim 1, wherein the instructions further cause the system to perform: configuring the multitenant VPN spanning service-side exterior Border Gateway Protocol (eBGP) peer at the edge of a service provider network.
4. A system comprising:
a multitenant virtual private network (VPN) gateway protocol labeling engine coupled to a multitenant VPN, wherein the multitenant VPN gateway protocol labeling engine is coupled to a branch node (B-node) router and a service node (S-node) router;
a flow characteristics datastore coupled to the multitenant VPN gateway protocol labeling engine;
a multitenant VPN gateway protocol routing engine coupled to the multitenant VPN;
a routing datastore coupled to the multitenant VPN gateway protocol routing engine;
a consistent hashing engine configured to compute a symmetric hash value based on packet header fields including source IP address, destination IP address, source port, destination port, and protocol field;
a first exterior Border Gateway Protocol (eBGP) peer, coupled to the multitenant VPN gateway protocol labeling engine, that is configured to run through a VPN tunnel of the multitenant VPN; and
a second eBGP peer, coupled to the multitenant VPN gateway protocol routing engine, that is configured to run through the VPN tunnel of the multitenant VPN;
wherein, in operation:
the consistent hashing engine computes the symmetric hash by sorting at least the IP addresses and port numbers of the packet header fields prior to hashing, such that both forward and reverse packets associated with a flow are mapped to a common service point attachment node (S-node);
the consistent hashing engine selects the S-node using the symmetric hash;

the multitenant VPN gateway protocol labeling engine tags a first packet of the flow, bound for the selected S-node through the VPN tunnel of the multitenant VPN via the B-node router, with a first tag that is identifiable using the flow characteristics datastore, wherein the S-node router is configured to preserve information carried in tags applied at the B-node router such that the tag information is not forgotten across the VPN tunnel, thereby enabling enforcement of policy associated with the flow across the multitenant VPN network;

the multitenant VPN gateway protocol routing engine identifies the first packet as part of the flow by reading the first tag and enforces gateway protocol rules applicable to the flow when using the routing datastore to route the first packet, wherein association enables maintaining flow identity during scaling of S-nodes by employing a consistent hashing function;

the multitenant VPN gateway protocol routing engine determines whether a second packet, received from a service provider via the S-node and bound for the B-node through the VPN tunnel, has the first tag;

when the second packet has the first tag, the multitenant VPN gateway protocol routing engine identifies the second packet as belonging to the flow and enforces the gateway protocol rules applicable to the first flow when using the routing datastore to route the second packet, and responsive to the identification of the second packet as belonging to the flow based on the first tag, running eBGP pairing within the VPN tunnel between the first eBGP peer and the second eBGP peer; and when the second packet does not have the first tag, the multitenant VPN gateway protocol routing engine identifies the second packet as belonging to a different flow.

5. The system of claim 4, further comprising:

an autonomous branch network multitenant VPN user interface engine coupled to the multitenant VPN, wherein one or more of the gateway protocol rules are provided via an autonomous branch network multitenant VPN user interface of the autonomous branch network multitenant VPN user interface engine.

6. The system of claim 4, wherein the multitenant VPN gateway protocol labeling engine includes a Border Gateway Protocol (BGP) labeling engine.

7. The system of claim 4, wherein the multitenant VPN gateway protocol routing engine includes a Border Gateway Protocol (BGP) routing engine.

8. The system of claim 4, wherein the multitenant VPN gateway protocol labeling engine is coupled to a virtual network facing node (V-node) router.

9. A method comprising:

computing a symmetric hash value based on packet header fields including source IP address, destination IP address, source port, destination port, and protocol field, wherein the symmetric hash is computed by sorting at least the IP addresses and port numbers of the packet header fields prior to hashing, such that both forward and reverse packets associated with a flow are mapped to a common service point attachment node (S-node);

selecting the S-node based on the symmetric hash;

configuring a branch node (B-node) router as a first exterior Border Gateway Protocol (eBGP) peer for a virtual private network (VPN) tunnel through a multitenant VPN network;

configuring a service node (S-node) router as a second eBGP peer for the VPN tunnel through the multitenant VPN network, wherein the S-node router is configured to preserve information carried in tags applied at the B-node router such that the tag information is not forgotten across the VPN tunnel, thereby enabling enforcement of policy associated with the flow across the multitenant VPN network;

tagging a first packet of the flow, bound for the selected S-node through the VPN tunnel of the multitenant VPN network via the B-node router, with a first tag;

associating the first tag with the flow through the multitenant VPN network, wherein the association enables maintaining flow identity during scaling of S-nodes by employing a consistent hashing function;

determining whether a second packet, received from a service provider via the S-node and bound for the B-node through the VPN tunnel, has the first tag;

when the second packet has the first tag, identifying the second packet as belonging to the flow, and responsive to identifying the second packet as belonging to the flow based on the first tag, running eBGP pairing within the VPN tunnel between the first eBGP peer and the second eBGP peer; and when the second packet does not have the first tag, identifying the second packet as belonging to a different flow.

10. The method of claim 9, further comprising:

configuring a multitenant VPN spanning branch-side exterior Border Gateway Protocol (eBGP) peer at the edge of an autonomous branch network.

11. The method of claim 9, further comprising:

configuring the multitenant VPN spanning service-side exterior Border Gateway Protocol (eBGP) peer at the edge of a service provider network.

* * * * *